//  
United States Patent [19]

Meyer

[11] 4,172,324
[45] Oct. 30, 1979

[54] SURFACE ANGLE MEASURING DEVICE

[75] Inventor: Franz-Joseph Meyer, Leverkusen, Fed. Rep. of Germany

[73] Assignee: Goetzewerke Friedrich Goetze AG, Burscheid, Fed. Rep. of Germany

[21] Appl. No.: 907,847

[22] Filed: May 19, 1978

[30] Foreign Application Priority Data

May 21, 1977 [DE] Fed. Rep. of Germany ....... 2723104

[51] Int. Cl.$^2$ ............................ G01B 5/24; G01B 7/30
[52] U.S. Cl. ................................ 33/174 E; 33/174 L; 33/DIG. 17
[58] Field of Search .................. 33/1 N, 1 PT, 174 E, 33/174 L, DIG. 17

[56] References Cited

U.S. PATENT DOCUMENTS

| 1,411,911 | 4/1922 | Desbains | 33/174 E |
| 1,627,360 | 5/1927 | Wallin | 33/174 E |
| 2,678,498 | 5/1954 | Rimmel | 33/75 |
| 2,702,430 | 2/1955 | Bohnet | 33/75 R |
| 3,738,012 | 6/1973 | Sherman | 33/174 E |
| 4,077,130 | 3/1978 | Possati | 33/174 E |

FOREIGN PATENT DOCUMENTS

| 921358 | 12/1954 | Fed. Rep. of Germany | 33/174 E |
| 15993 | 12/1958 | Fed. Rep. of Germany . | |
| 541127 | 10/1973 | Fed. Rep. of Germany . | |
| 263314 | 11/1949 | Switzerland | 33/174 E |
| 712513 | 7/1954 | United Kingdom | 33/174 E |

*Primary Examiner*—Richard R. Stearns
*Attorney, Agent, or Firm*—Spencer & Kaye

[57] ABSTRACT

A device for measuring the angle of inclination of a surface, particularly the flank angle of a piston ring having a trapezoidal cross section. The device includes a feeler assembly which can be brought into contact with the surface. The feeler assembly comprises a pivotally supported feeler head provided with a measuring edge adapted to lie on the surface to be measured and thus conform to the surface inclination. The device further has an arrangement to measure the pivot angle of the feeler head when the measuring edge lies along its entire length on the surface to be measured.

7 Claims, 3 Drawing Figures

SURFACE ANGLE MEASURING DEVICE

BACKGROUND OF THE INVENTION

This invention relates to a device for measuring the angle of inclination of a workpiece surface and it is concerned in particular with measuring the flank angle of piston rings having a trapezoidal cross section. The device includes a feeler which is mounted on a holder and which can be positioned on the surface of the workpiece.

In an internal combustion engine, for example, it is a condition for the proper functioning of each piston ring that the latter, with its outer peripheral face, closely engages the cylinder wall and further, with a side face, closely engages the side wall of the associated piston groove. During operation of the engine, however, coked lubricating oil may often cause undesirable carbon deposits in the piston groove thus adversely affecting the radial mobility of the piston ring. By using piston rings of single-trapezoidal or dual-trapezoidal cross section in conjunction with similarly shaped piston groove cross sections, during radial ring motion there results an increase of the axial play between the piston ring and the piston groove, thus preventing a jamming of the piston ring in the groove. Further, such an arrangement effects a removal of oil carbon from the grooves. In order to achieve, however, a satisfactory flank seal between the piston ring and the piston groove, the flank angle (and its deviation from the permissible tolerances) has to be determined with precision.

In addition to maintaining the trapezoid angle within the desired values, the oblique position of the cross section of the piston ring is also of significance for ensuring a proper operation. The trapezoid angle is defined as the angle formed by the two opposite ring flanks of the sum of the two flank angles, particularly in piston rings having a dual-trapezoidal cross section. The oblique position of the cross section of the piston ring is defined as the deviation of the lower, planar ring flank of a single-trapezoidal ring or the deviation of the angle-halving line of the trapezoid angle of a dual-trapezoidal piston ring from a radial plane oriented perpendicularly to the piston ring axis. By single-trapezoidal piston rings or piston rings having a single-trapezoidal cross section there are meant piston rings whose cross section is a trapezoid in which one of the non-parallel sides is perpendicular to the piston ring axis. By dual-trapezoidal piston rings or piston rings having a dual-trapezoidal cross section, there are meant piston rings whose cross section is a trapezoid in which both non-parallel sides are oriented obliquely with respect to the piston ring axis. Thus, a dual-trapezoidal piston ring could be regarded as two back-to-back arranged single-trapezoidal piston rings.

For measuring the ring height of a single-trapezoidal or dual-trapezoidal piston ring, a device is known which is disclosed in German Offenlegungsschrift (Laid-Open Application) No. 1,902,470 and in which there are provided two axially oppositely located piston ring holders which engage the ring flanks and one of which is connected with a settable measuring device. The piston ring holders are rotatably supported in prismatic guides for adapting them to the flank faces having different flank angles. The holders which adapt themselves to the particular flank angle in each measuring process serve solely for the symmetrical alignment of the piston ring.

In the technical publication K8 entitled "Neue Verfahren zur Bestimmung der Qualität von Kolbenringen" (New Methods of Determining the Quality of Piston Rings) and issued by the firm Friedrich Goetze AG in Burscheid, Federal Republic of Germany, there is further described a device for measuring the flank angle of piston rings. The device described therein has two feelers arranged to a predetermined radial distance from one another and constituting a first feeler pair. Further, relative to a line of symmetry of the cross section of the piston ring in case of dual-trapezoidal piston rings, there is provided a second feeler pair arranged opposite the first feeler pair. The feelers are connected with inductive path sensors known by themselves, so that the individual measured values may be read by means of a preferably electric display device. The accuracy of the trapezoid angle which is computable based on the measured values depends on the accuracy of the radial distance between the two feelers.

SUMMARY OF THE INVENTION

It is an object of the invention to provide an improved device for measuring the angle of inclination of a workpiece surface, particularly the flank angle of a piston ring with a greater accuracy than heretofore possible, even in case of taking serial measurements.

This object and others to become apparent as the specification progresses, are accomplished by the invention, according to which, briefly stated, the device for measuring the angle of inclination of a surface, particularly the flank angle of a piston ring having a trapezoidal cross section, includes a feeler assembly which can be brought into contact with the surface. The feeler assembly comprises a pivotally supported feeler head provided with a measuring edge adapted to lie on the surface to be measured and thus conform to the surface inclination. The device further has an arrangement to measure the pivot angle of the feeler head when the measuring edge lies along its entire length on the surface to be measured.

By providing only a single feeler, a precise adjustment of the feelers necessary in the prior art structure is dispensed with. By providing, at the feeler head, a measuring edge conforming to the workpiece surface, coupled with the direct measuring of the pivotal angle of the feeler head, it has become superfluous to effect serial measurements, at different locations, of the inclined workpiece surfaces, individual height measurements as well as their conversion into angles. A further advantage resides in the frictionless conforming engagement of the feeler head with the workpiece surface.

In order to achieve an optimum measuring result, the pivotal axis of the feeler head extends exactly at right angles to the measuring edge. This means that for measuring the flank angle at the piston ring, the pivotal axis of the feeler head is tangential to the axis of the piston ring, whereas the measuring edge of the feeler head is oriented radially with respect to the axis of the piston ring.

Further, for achieving accurate measuring results, it is expedient to provide that the pivotal bearing of the feeler head is play-free. For this purpose, according to a further feature of the invention, the pivotal bearing is formed of a bearing edge and a cradle receiving the bearing edge. In order to maintain lateral shifts of the measuring edge about the bearing edge at the smallest possible value, the bearing edge is preferably formed on the feeler holder, whereas the cradle is provided in the feeler head, at its side oriented away from the measuring edge. For connecting the feeler head with the holder, there are provided preferably two tension springs which are arranged at either side of the feeler head and the points of attack of which lie in a plane which contains the bearing edge and which is oriented perpendicularly to the measuring edge.

For measuring the pivot angle of the feeler head, there is preferably provided an inductive path sensor known by itself. For this purpose, the feeler head has two arms which extend at opposite sides of the cradle away from the workpiece. The arms have ends which are connected with one another by means of a web which, in turn, extends through the induction coil and functions as its core. In this manner, upon any pivotal motion of the feeler head away from its zero position, in the inductive path sensor, an electric signal is generated, the duration of which is proportionate to the pivot angle.

According to further features of the invention, the feeler and the feeler holder are secured to a carrier which is height-adjustable with respect to the workpiece surface for adapting the device to workpieces of different dimensions. Preferably, the carrier is pivotal about an axis lying approximately in the plane of the workpiece, so that in case of workpieces having greater angles of inclination, the carrier, together with the feeler and the feeler holder, can be set to the desired value of the angle of inclination and then only the deviations of the actual values from such a desired value (reference value) need to be measured.

According to a further feature of the invention, particularly for the simultaneous measurement of both flank angles of a dual-trapezoidal piston ring, there are provided two feelers arranged on either side of an axis of symmetry passing through the middle of the piston ring cross section. In such an arrangement, both feeler carriers are pivotal about a common axis lying in the symmetry plane of the ring cross section. In this manner not only the two angles of inclination of the flank faces of the piston rings can be measured, but also the inclined position of the piston ring cross section may be simultaneously determined from the measured values.

DESCRIPTION OF THE PREFERRED EMBODIMENT

Figure 1:
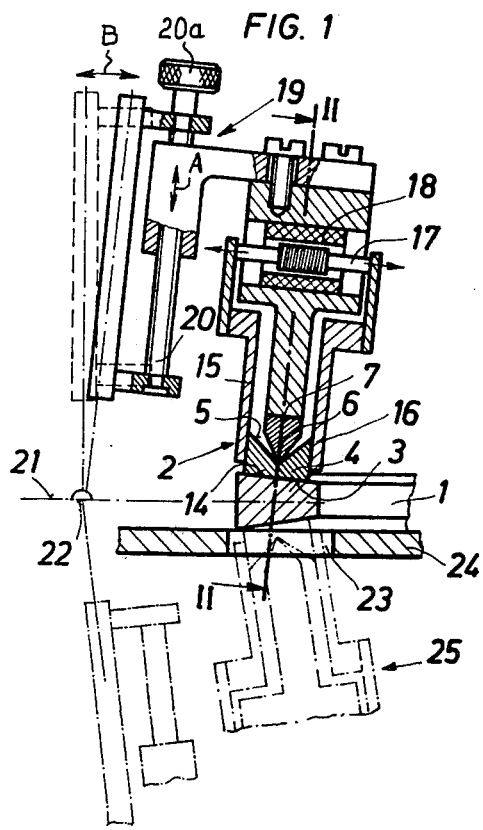
FIG. 1 is a sectional elevational view of a measuring device according to a preferred embodiment of the invention.
Figure 2:
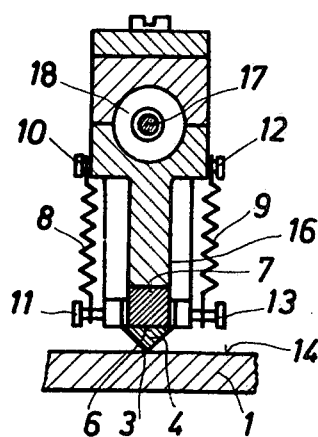
FIG. 2 is a sectional view taken along line II—II of FIG. 1.

Turning now to FIGS. 1 and 2, the measuring device shown therein comprises a feeler assembly generally indicated at 2. The feeler assembly 2 can be lowered on the flank face of a piston ring 1 for measuring the flank angle thereof. The feeler assembly 2 has a feeler head 4 which, in turn, is provided with a measuring edge 3 oriented towards the piston ring 1 and extending radially with respect thereto. The feeler head 4 further has, on its side oriented away from the measuring edge 3, a cradle 5 of V-shaped cross section for receiving a bearing edge 6 of a feeler holder 7. Two tension springs 8 and 9 urge the bearing edge 6 into a clearance-free and pivotal engagement with the cradle 5. The points of attack 10, 11 and 12, 13, respectively, of the tension springs 8 and 9 lie in a single plane that contains the bearing edge 6 and which is perpendicular to the measuring edge 3 (and also to the surface 14 of the workpiece 1).

The feeler head 4 has two arms 15 and 16 which extend away from the piston ring 1 along the holder 7 at either side of the bearing edge 6. The ends of the arms 15 and 16 are connected to one another by means of a web 17 which extends through an inductive coil 18 firmly held in the holder 7 and serving as a soft iron core for the induction coil 18.

The feeler assembly 2 is mounted on a carrier 19 by means of a threaded spindle 20. By rotating the spindle knob 20a, the feeler assembly may be moved in the direction of the arrow A towards or away from the piston ring 1 positioned on a workpiece platform 24. Further, the carrier 19 is pivotal about an axis 22 which lies in a plane of symmetry 21 of the piston ring cross section and which is perpendicular to the drawing plane of FIG. 1. By adjusting the angular position of the carrier 19 about the axis 22 in the direction of the double-headed arrow B, the desired value (reference value) of the flank angle to be measured is set.

In case a dual-trapezoidal piston ring is to be measured, a second measuring device 25 (only partially shown) is provided at the other side of the piston ring. In such an arrangement, in the platform 24, an opening 23 is provided through which the end portion of the feeler assembly of the second measuring device extends. Further, the carrier (only partially shown) of the second measuring device 25 has the same pivot axis 22 as the carrier 19.

For performing the flank angle measuring process, the feeler assembly 2 is moved towards the ring flank by rotating the spindle 20, so that the measuring edge 3 which is oriented radially with respect to the piston ring 1, contacts the flank face 14. If such a contacting occurs simultaneously along the entire length of the measuring edge 3, the feeler head 4 does not execute a pivotal motion about the bearing edge 6 and thus the core 17 remains stationary with respect to the coil 18. As a result, no signal is generated by the coil 18. Thus, the measured flank angle corresponds to the desired flank angle set by means of the carrier 19 as described above.

If, on the other hand, the measuring edge 3 is not accurately parallel to the flank face 14 as the feeler assembly 2 approaches the latter (by lowering the feeler assembly 2 on the threaded spindle 20), a contact between the flank face 14 and the measuring edge 3 does not occur along the entire length of the measuring edge 3. The feeler head 4, however, seeks to assume a position in which its measuring edge 3 lies with its full length on the flank face. This results in a pivotal motion of the feeler head 4 about the bearing edge 6 of the holder 7 and an axial displacement of the core 17 with respect to the coil 18. Such a displacement generates a signal in the inductive path sensor 17, 18. Such a signal is a function of the flank angle (or a deviation of the desired flank angle value), since, for example, the duration of the signal is proportionate to the pivotal displacement of the feeler head 4 about the bearing edge 6. The signal generated by the inductive path sensor 17, 18 is further processed by display and evaluating apparatus (not shown).

Figure 3:
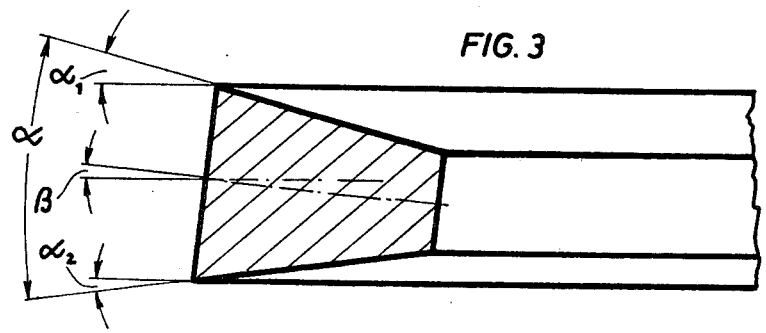
FIG. 3 is a cross-sectional view of a dual-trapezoidal piston ring, showing the angles to be measured by the device.

FIG. 3 illustrates the values to be determined by the above-described device. The trapezoid angle $\alpha$ of a dual-trapezoidal piston ring is obtained as the sum of the two flank angles $\alpha_1+\alpha_2$. The oblique orientation of the ring cross section is determined by means of the angle $\beta$ which is the difference between the flank angles $\alpha_1$ and $\alpha_2$.

The above cited inductive path sensor 17, 18 is not subject of the invention, because those sensors are well known in the technology in various applications. An inductive path sensor consists generally of a ferrotype core and a current-carrying coil. By telescoping the core in the coil the path of the core leads to a deformation of the magnetic field (induction) and therefore to a change of the apparent resistance which is indicated by a relevant instrument.

It is to be understood that the above description of the present invention is susceptible to various modifications, changes and adaptations, and the same are intended to be comprehended within the meaning and range of equivalents of the appended claims.

What is claimed is:

1. In a device for measuring the angle of inclination of a workpiece surface with respect to a reference value, including a feeler assembly; a holder on which the feeler assembly is mounted; and positioning means for arranging the feeler assembly on the workpiece surface; the improvement comprising
    (a) a feeler head forming part of said feeler assembly;
    (b) a measuring edge formed on said feeler head for conforming to the surface in the direction of inclination to be measured;
    (c) bearing means for pivotally supporting said feeler head on said holder to provide for an angular displacement of said feeler head about a pivotal axis for adapting the inclination of said measuring edge to that of the workpiece surface; said bearing means being formed by a bearing edge and a cradle receiving said bearing edge; said bearing edge coinciding with said pivotal axis and being oriented perpendicularly to said measuring edge; and
    (d) signalling means for determining the angular displacement of said feeler head about said pivotal axis from a normal position.

2. A device as defined in claim 1, wherein said bearing edge is formed on said holder and said cradle is formed on said feeler head.

3. A device as defined in claim 1, wherein said feeler assembly further comprises two tension springs each connected to said feeler head and said holder for supporting said feeler head on said holder.

4. A device as defined in claim 3, wherein the force of said tension springs is applied to said feeler head and said holder at points which define a single plane containing said bearing edge and being oriented perpendicularly to said measuring edge.

5. In a device for measuring the angle of inclination of a workpiece surface with respect to a reference value, including a feeler assembly; a holder on which the feeler assembly is mounted; and positioning means for arranging the feeler assembly on the workpiece surface; the improvement comprising
    (a) a feeler head;
    (b) a measuring edge formed on said feeler head for conforming to the surface in the direction of inclination to be measured;
    (c) two arms affixed to said feeler head at opposite ends of said measuring edge and flanking said holder; said feeler head, said measuring edge and said arms forming part of said feeler assembly;
    (d) bearing means for pivotally supporting said feeler head on said holder to provide for an angular displacement of said feeler head about a pivotal axis for adapting the inclination of said measuring edge to that of the workpiece surface; and
    (e) an inductive displacement-responsive arrangement for determining the angular displacement of said feeler head about said pivotal axis from a normal position; said inductive displacement-responsive arrangement comprising
        (1) an inductive coil mounted on said holder; and
        (2) a metal web member connecting with one another ends of said arms remote from said feeler head; said metal web member extending through said inductive coil and constituting the core thereof.

6. In a device for measuring the angle of inclination of a workpiece surface with respect to a reference value, including a feeler assembly; a holder on which the feeler assembly is mounted; and positioning means for arranging the feeler assembly on the workpiece surface; the improvement comprising
    (a) a feeler head forming part of said feeler assembly;
    (b) a measuring edge formed on said feeler head for conforming to the surface in the direction of inclination to be measured;
    (c) bearing means for pivotally supporting said feeler head on said holder to provide for an angular displacement of said feeler head about a pivotal axis for adapting the inclination of said measuring edge to that of the workpiece surface;
    (d) signalling means for determining the angular displacement of said feeler head about said pivotal axis from a normal position;
    (e) a carrier on which said holder and said feeler assembly are mounted; said carrier having height-adjusting means for moving said holder and said feeler assembly towards or away from the workpiece surface; said carrier being comprised in said positioning means; and
    (f) means for pivotally adjusting said carrier about an axis which lies at least approximately in a plane of the workpiece and which is at least approximately parallel to said pivot axis of said bearing means.

7. In a device for the simultaneous measuring of the inclination of opposite surfaces of a workpiece constituted by a piston ring; the improvement comprising two units arranged in a mirror-image relationship with respect to a symmetry plane passing through the cross section of the piston ring; each unit comprising:
    (a) a feeler assembly having a feeler head and a measuring edge formed on the feeler head for conforming to the respective workpiece surface in the direction of inclination to be measured;
    (b) a holder on which the feeler assembly is mounted;
    (c) bearing means for pivotally supporting said feeler head on said holder to provide for an angular displacement of said feeler head about a pivotal axis for adapting the inclination of said measuring edge to that of the respective workpiece surface;
    (d) signalling means for determining the angular displacement of said feeler head about said pivotal axis from a normal position; and
    (e) positioning means for arranging the feeler assembly on the respective workpiece surface; said positioning means comprising a carrier on which said holder and said feeler assembly are mounted and means for pivotally adjusting each carrier about a common axis which lies in said symmetry plane and which is generally parallel to the pivot axis of the respective bearing means.

* * * * *